United States Patent
Morales et al.

(10) Patent No.: US 8,045,827 B2
(45) Date of Patent: Oct. 25, 2011

(54) IMAGE DOWNSAMPLING DURING PROCESSING

(75) Inventors: Javier A. Morales, Irondequoit, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 983 days.

(21) Appl. No.: 11/956,800

(22) Filed: Dec. 14, 2007

(65) Prior Publication Data

US 2009/0154836 A1 Jun. 18, 2009

(51) Int. Cl.
G06T 3/40 (2006.01)
G06K 15/02 (2006.01)
(52) U.S. Cl. ............... 382/299; 358/1.2; 345/670
(58) Field of Classification Search ............ 382/298, 382/299; 345/660, 667, 668, 670; 358/1.2, 358/451
See application file for complete search history.

(56) References Cited

U.S. PATENT DOCUMENTS

| 6,075,886 A | 6/2000 | de Queiroz |
| 6,144,461 A * | 11/2000 | Crean et al. ............ 358/1.9 |
| 6,199,077 B1 | 3/2001 | Inala et al. |
| 7,224,890 B2 | 5/2007 | Kato |
| 2003/0007695 A1 * | 1/2003 | Bossut et al. ......... 382/239 |
| 2005/0144256 A1 * | 6/2005 | Blumberg ............. 709/217 |

* cited by examiner

Primary Examiner — Jon Chang
(74) Attorney, Agent, or Firm — Pepper Hamilton LLP

(57) ABSTRACT

A method of preparing a document for printing may include determining a preferred image resolution for an image on a document. An electronic file may be received. The electronic file may comprise data representing a first embedded image having a nominal resolution. A job may be received. The job may comprise one or more operations to be performed on the electronic file. A computing device may determine an effective resolution for the first embedded image based on the nominal resolution and the one or more operations. It is determined whether the effective resolution for the first embedded image is greater than the preferred image resolution. The first embedded image may be downsampled based on a scaling factor. A printing device may process the job using the downsampled first embedded image.

18 Claims, 4 Drawing Sheets

IMAGE DOWNSAMPLING DURING PROCESSING

BACKGROUND

Documents are commonly produced containing a plurality of images, and such documents often have large file sizes. As such, computer systems used to process such large documents into displayable images require a substantial amount of processing time.

Downsampling is a technique used to decrease the size of a document by reducing the number of pixels in an image. Image downsampling is used to decrease extraneous image data. Downsampling techniques include, but are not limited to, subsampling, bicubic downsampling, and average downsampling. Decreasing the size of the document allows a document to be more easily and quickly, downloaded, transmitted and/or stored.

Image downsampling can be used to optimize, for example, Portable Document Format (PDF) files. Images are often compressed in PDF files in order to increase speed and functionality. The speed and functionality is increased because a compressed image is smaller and has less bytes. Due to the decreased number of bytes, a machine may process (i.e., upload, download, save and/or print) the image at a faster speed.

For example, Acrobat® 8 from Adobe Systems, Inc. deletes an image if that image occurs multiple times within an electronic document file. Acrobat® 8 deletes a redundant image if it is fully redundant or identical in all aspects. By downsampling the image, a smaller PDF file can be created because the image is stored only a single time in the document. References to the image are used when there are multiple instances of the image in the document.

SUMMARY

In an embodiment, a method of preparing a document for printing may include determining a preferred image resolution for an image on a document, receiving an electronic file comprising data representing a first embedded image having a nominal resolution, receiving a job comprising one or more operations to be performed on the electronic file, determining, by a computing device, an effective resolution for the first embedded image based on the nominal resolution and the one or more operations, determining whether the effective resolution for the first embedded image is greater than the preferred image resolution, downsampling the first embedded image based on a scaling factor, and processing the job, by a printing device, using the downsampled first embedded image.

In an embodiment, a system for preparing documents for printing may include a computing device and a resource. The computing device may be configured to determine a preferred image resolution, receive a file comprising a first embedded image having a nominal resolution, receive a job comprising one or more operations to be performed on the file, determine an effective resolution for the first embedded image, and downsample the first embedded image based on a scaling factor if the effective resolution for the first embedded image is greater than the preferred image resolution. The resource maybe configured to process a job using the downsampled first embedded image.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

A "job" refers to a logical unit of work that is to be completed for a customer. In a document production environment, a job may include one or more print jobs from one or more clients. A document production environment may include multiple devices configured to process a plurality of jobs. Although the disclosed embodiments pertain to document production systems, the disclosed methods and systems can be applied to production systems in general.

A "printing device" is an electronic device that is capable of receiving commands, printing text and/or images on a substrate, and/or scanning a document. Printing devices may include, but are not limited to, network printers, production printers, copiers, faxes and other devices using ink or toner, and scanners. As used herein ink and toner are used interchangeably to refer to wet or dry material that forms an image or text on a substrate. Printing devices may also perform a combination of functions such as printing/scanning faxing, in which case such devices may be considered to be multifunctional devices.

"Downsampling" is the digital process of changing the dimensions of digital imagery by analyzing original data from a digital image. For example, downsampling may be performed on an embedded image based on a scaling factor. Downsampling techniques may include image interpolation methods such as, but not limited to, average downsampling, bicubic downsampling, and/or subsampling.

"Image resolution" refers to the detail of an image. In an embodiment, image resolution may be expressed in terms of dots per inch (dpi) or pixels per inch (ppi).

An "object" is a representation of a corresponding embedded image. An object may be, but is not limited to, a picture, a photograph, a symbol, a design, a logo or the like. The object may appear within a document multiple times. For example, a first and second embedded image may each be an instance of a first object.

Figure 1:
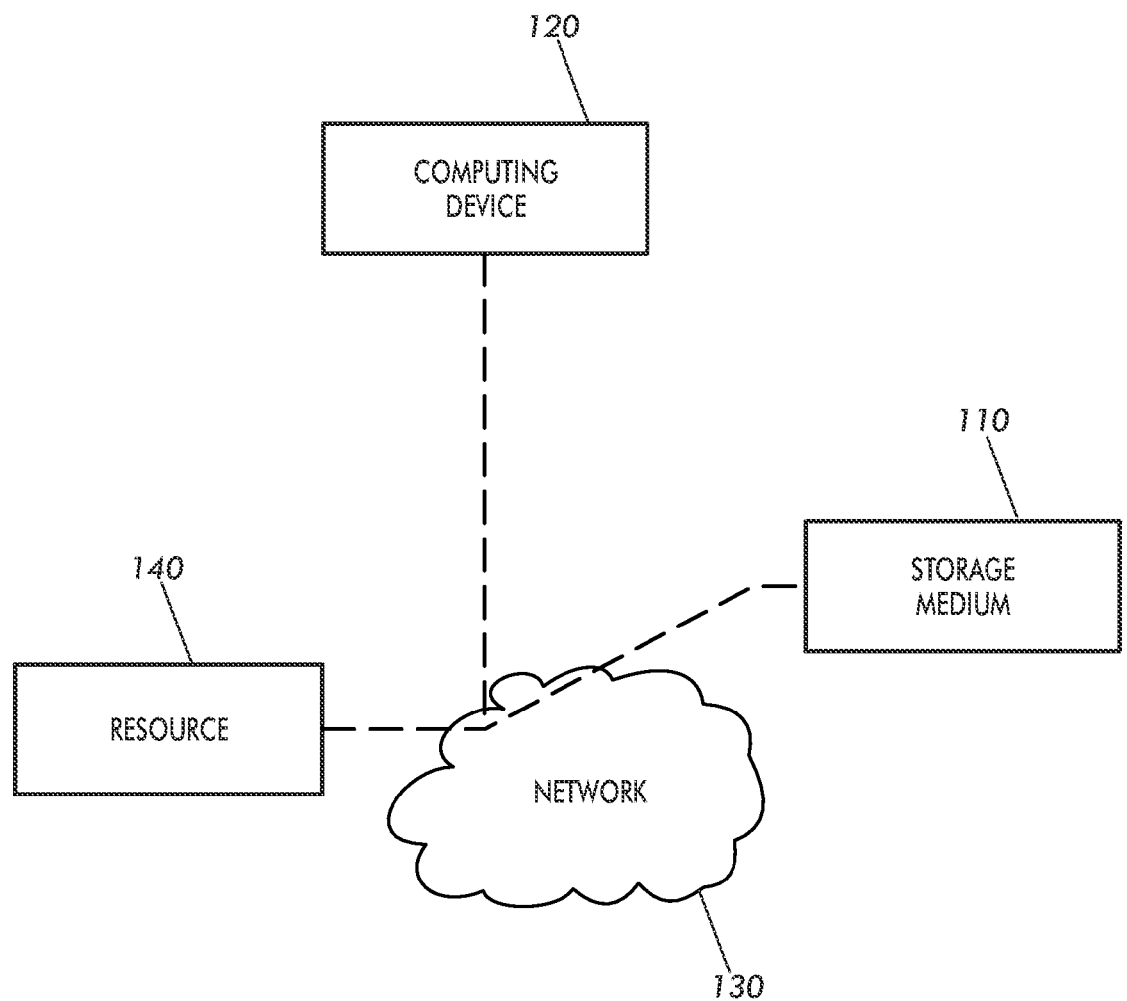
FIG. 1 illustrates exemplary elements of a system for object level image downsampling according to an embodiment.

FIG. 1 illustrates exemplary elements of a system for object level image downsampling according to an embodiment. As shown in FIG. 1, the system includes a storage medium 110, a computing device 120, a network 130 and a resource 140. The storage medium 110 may be any repository of searchable data, such as a computer-readable memory, database, table or other medium. The storage medium 110 may communicate with the computing device 120 and the resource 140 via a network 130 such as a local area network (LAN), wide area network (WAN), Internet, Intranet, and/or any other communications network. In an embodiment, the storage medium 110 may be distributed across a plurality of devices including, but not limited to, the computing device 120 and/or the resource 140. In an embodiment, the storage medium 110, or a portion thereof, may be contained within one or more of the computing device 120 or the resource 140. In such an embodiment, the storage medium 110 may directly communicate with the computing device 120 or the resource 140 in which it is contained instead of via the network 130.

A computing device 120 processes data to perform one or more functions. A computing device 120 may be any processor-based device such as, for example, a server, a personal computer, a personal digital assistant, a web-enabled phone, a smart terminal, a dumb terminal, and/or another electronic device capable of communicating in a networked environment.

A resource 140 is a device that generates an electronic document. A resource 140 may include, but is not limited to, a printing device, a multifunction device, a router, a web application and other similar devices. Each resource 140 may be used to process one or more jobs assigned to that resource.

Figure 2:
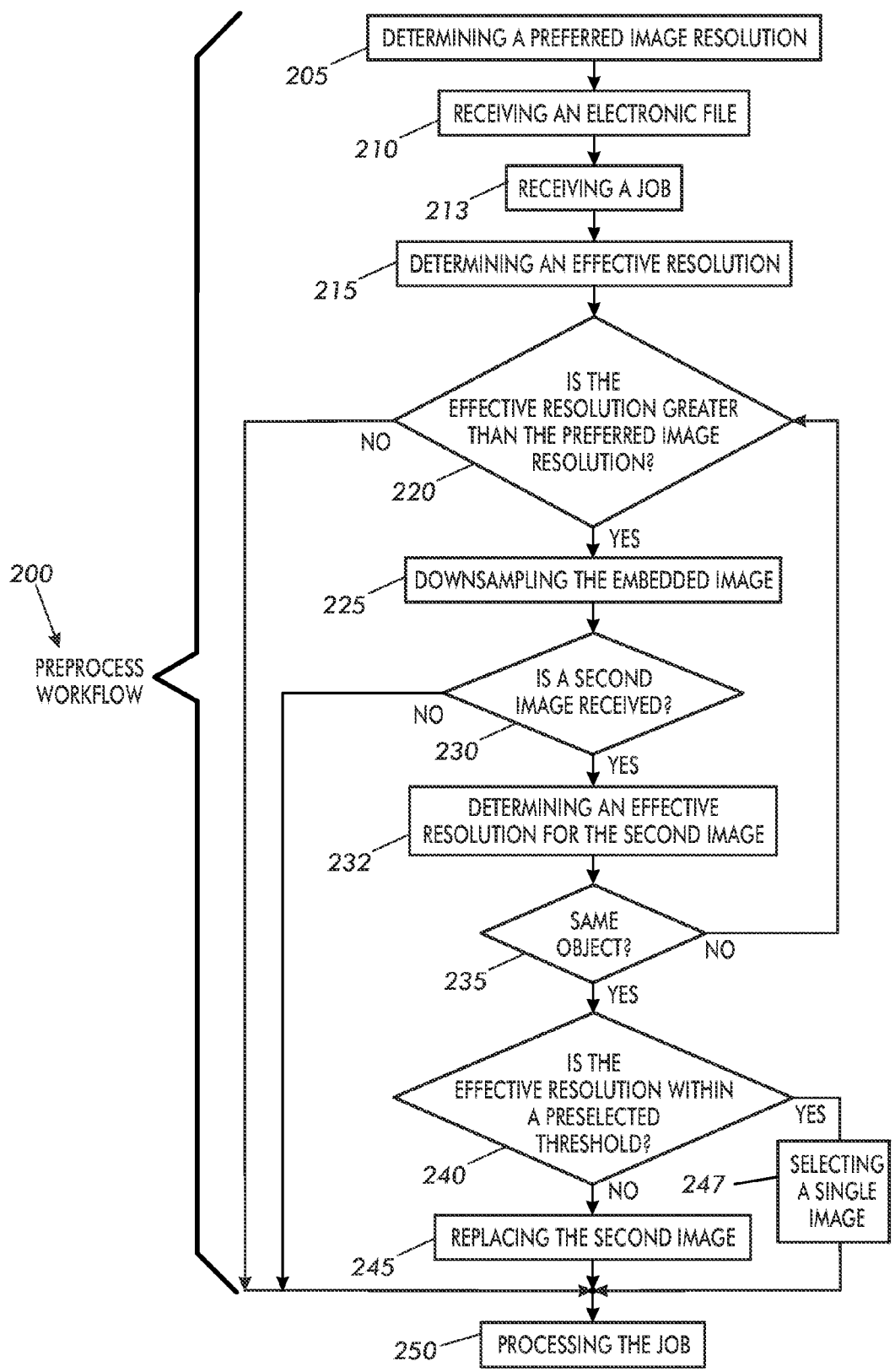
FIG. 2 depicts an exemplary method of image downsampling according to an embodiment.

FIG. 2 depicts an exemplary method of image downsampling according to an embodiment. Image downsampling may include a preprocessing workflow and processing workflow. A preprocessing workflow may perform preparatory services on a job before the job is provided to the processing workflow. Exemplary operations performed by a preprocessing workflow may include, but are not limited to, determining a preferred image resolution, receiving an embedded image, determining an effective resolution of the embedded image, comparing the effective resolution for the embedded image with a preferred image resolution, and downsampling the embedded image based on a scaling factor. The processing workflow may include processing one or more jobs using the embedded image. To fully automate the preprocessing workflow and the processing workflow, a system may automate decisions and/or operations. Decisions, such as those relating to the preferred image resolution, may influence the preprocessing workflow and the processing workflow.

As shown in FIG. 2, in the preprocessing workflow, a preferred image resolution may be determined 205. In an embodiment, the preferred image resolution may be received by a computing device from another device or a user. In an alternate embodiment, the preferred image resolution may be stored or generated by a computing device.

In an embodiment, a preferred image resolution may be received via a network interface. A preferred image resolution for an image on a document may be determined 205 from a resource or by raster image processing (RIPing) the document. In an embodiment, the preferred image resolution may include a value such as, but not limited to, the default RIP resolution. Alternatively, the preferred image resolution may include configuration data, setup data and/or self-descriptive data.

An electronic file, including data representing a first embedded image, may be received 210 during the preprocess workflow. In an embodiment, the file, including data representing the first embedded image, may be received 210 by a computing device. In an embodiment, criteria for an embedded image may be specified. In an embodiment, the file may include data representing one or more embedded images. Each embedded image may have a nominal image resolution (i.e., the image resolution of the embedded image when the image is received).

A job may be received 213 during the preprocessing workflow. In an embodiment, the file and the job may be received sequentially. In an alternate embodiment, the file and the job may be received simultaneously. The job may include one or more operations to be performed on the electronic file. An operation is an event that changes the resolution of an embedded image. Exemplary operations may include, but are not limited to, scaling an image and rotating an image.

An effective resolution of a first embedded image may be determined 215 during the preprocessing workflow. The effective resolution is the image resolution of the image after adjusting the nominal resolution for one or more operations. The effective resolution may be determined 215 by evaluating the one or more operations performed on the embedded image.

The order in which the operations are performed on an embedded image may initially be determined when performing the preprocessing workflow. Operations may be evaluated in a sequential manner such that the effect of each operation is evaluated before a next operation is considered. For example, an imposition process may include an operation that automatically fits one or more images from a document into a predetermined size on a substrate. The system may determine a scaling factor required to place the document on the substrate. Moreover the image may be fitted to a box of a particular size and/or rotated. For example, a 600 by 800 pixel image may be placed in a 3 by 4 inch box so that the effective resolution is 200 dots per inch (dpi) (i.e., the lesser of 600 pixels/3 inches and 800 pixels/4 inches). Alternatively, the same image may be placed in a 4 by 3 inch box so that the effective resolution is 150 pixels (i.e., the lesser of 600 pixels/4 inches and 800 pixels/3 inches).

In an embodiment the effect of an operation for an embedded image may be determined 215 after evaluating the operation. In an alternate embodiment, the effect of a plurality of operations may be determined 215 simultaneously. A scaling factor may reflect the effect of each operation performed on the embedded image. Once the scaling factor is determined, the effective resolution of the image may be determined 215. In an embodiment, the scaling factor is the proportion between the effective resolution and the preferred image resolution.

The effective resolution for the first embedded image may be compared 220 to the preferred image resolution to determine whether the effective resolution is greater than the preferred image resolution. In an embodiment, the preferred image resolution may be a single number. The preferred image resolution may be a set of numbers or a range of values. In an embodiment, the preferred image resolution may be defined using predefined criteria. For example, the predefined criteria may require the preferred image resolution to be 500 dpi for a first operation and 300 dpi for a second operation.

If the effective resolution is greater than the preferred image resolution 220, the first embedded image may be downsampled by downsampling the data representing the first embedded image based on a scaling factor 225. If the effective resolution is less than the preferred image resolution 220, the job may be processed 250.

In an embodiment, the system may determine whether the electronic file includes data representing a second embedded image 230. If a second embedded image is not present in the electronic document, the job may be processed 250.

If a second embedded image is present, the effective resolution of the second image may be determined 232. An object of the first embedded image may be compared 235 to an object of the second embedded image. In an embodiment, a scaling factor and an effective resolution may be determined for each instance of an object.

If the object of the second embedded image differs from the object of the first embedded image, the effective resolution of the second image may be compared 220 to the preferred resolution. If the object of the second embedded image is the same as the object of the first embedded image, the effective resolution of the second embedded image may be compared 240 to the effective resolution of the first embedded image to determine whether the resolutions are within a preselected threshold. The preselected determined threshold may be, but is not limited to, a percentage or a difference between the effective resolution of the first embedded image and the effective resolution of the second embedded image.

If the second embedded image has an effective resolution that is not within the preselected threshold of the first embedded image, the second embedded image may be replaced with the first embedded image and downsampled 245.

If the effective resolution of the second embedded image is within a preselected threshold of the first embedded image, a single image may be selected 247. In an embodiment, if a file includes two or more images that each have the same object and the effective resolution of each image is within the preselected threshold, a single image may be selected 247 and the other images may be replaced with a reference to the selected image. In an embodiment, the image with the numerically smallest effective resolution may be selected. In an alternate embodiment, the image with the largest effective resolution may be selected 247. Selecting the image with the largest effective resolution may preserve image quality. In an embodiment, the first image may be selected 247. The job may be processed 250.

In an embodiment a scaling factor may be included with a reference to another image. If a reference includes a scaling factor, the images may have different effective resolutions. If the effective resolutions are within the predetermined threshold, the job may be processed 250. If the effective resolutions are not within the predetermined threshold, the reference may be replaced with the image, and the image may be downsampled 245 independently.

After the preprocessing workflow is completed, the images may be processed 250. The processing workflow performs one or more operations for a job. The processing workflow is performed for both the embedded images with less than the preferred image resolution and the downsampled images. As a result, the file size may be smaller, and the file may RIP more quickly. The downsampled image may include a smaller amount of data to be generated during rasterization. Rasterization is the task of taking an image and converting it into a pixel or dot image to output on a printing device.

Figure 3:
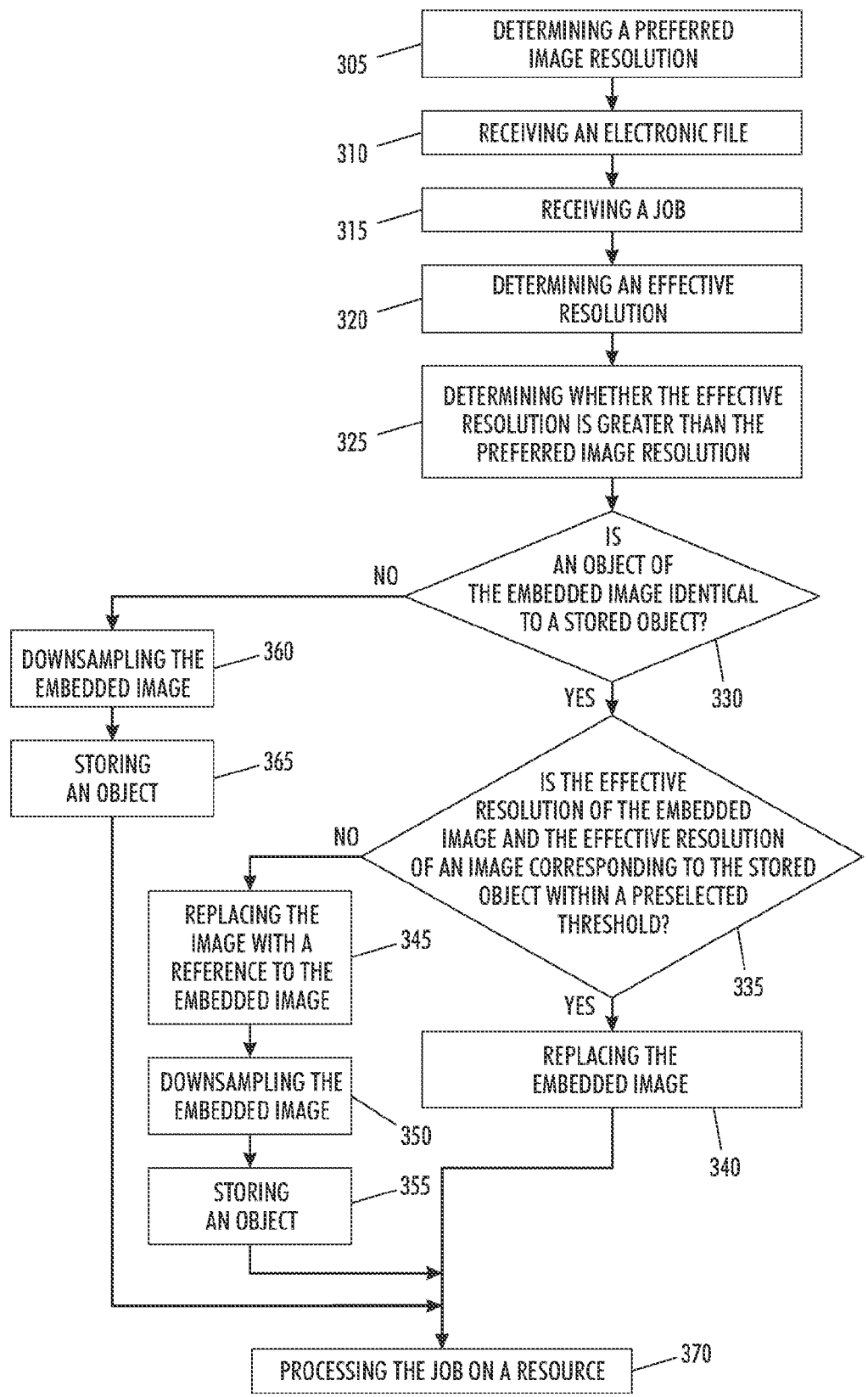
FIG. 3 depicts an exemplary flow diagram of a method of image downsampling according to an embodiment.

FIG. 3 depicts an exemplary flow diagram of a method of image downsampling according to an embodiment. Image downsampling may include a preprocessing workflow and processing workflow. A preprocessing workflow may perform preparatory services on a job before the job is provided to the processing workflow. The processing workflow may include processing one or more jobs using the embedded image. To fully automate the preprocessing workflow and the processing workflow, a system may automate decisions and/or operations. Decisions, such as those relating to the preferred image resolution, may influence the preprocessing workflow and the processing workflow.

As shown in FIG. 3, a preferred image resolution may be determined 305 during the preprocessing workflow. In an embodiment, a preferred image resolution may be determined 305 by a computing device. In an embodiment, a preferred image resolution may be determined 305 by any processor-based system. Determining 305 a preferred image resolution may include receiving a raster image processing resolution, receiving configuration data, and/or receiving a preferred image resolution from a user.

An electronic file may be received 310 during the preprocessing workflow. In an embodiment, an electronic file, including data representing a plurality of embedded images, may be received 310 by a computing device. In an embodiment, the file, including data representing a plurality of embedded images, may be received 310 by any processor-based system. In an embodiment, criteria for an embedded image may be specified. In an embodiment, the file may include data representing one or more embedded images. Each embedded image may include a portion of a document. Each embedded image may have a nominal resolution.

A job may be received 315 during the preprocessing workflow. In an embodiment, the file and the job may be received 315 sequentially. In an alternate embodiment, the file and the job may be received 315 simultaneously. In an embodiment, the job may be received 315 by a computing device. In an embodiment, the job may be received 315 by any processor-based system. The job may include one or more operations to be performed on the electronic file.

An effective resolution may be determined 320. In an embodiment, an effective resolution may be determined 320 by a computing device. In an embodiment, an effective resolution may be determined 320 by any processor-based system. The effective resolution for an embedded image may be determined 320 based on the nominal resolution and the one or more operations. In an embodiment, the one or more operations to be performed on the electronic file may include one or more of scaling and rotating.

The effective resolution for the embedded image may be compared with the preferred image resolution to determine 325 whether the effective resolution for the embedded image is greater than the preferred image resolution. When the effective resolution for the embedded image is greater than the preferred image resolution, the object of the embedded image may be compared with a stored object to determine 330 whether the objects are identical.

If the objects are identical, the effective resolution of the embedded image may be compared to the effective resolution of an image corresponding to the stored object to determine 335 whether the effective resolution of the embedded image and the effective resolution of an image corresponding to the stored object are within a preselected threshold.

If the effective resolution of the embedded image and the effective resolution of an image corresponding to the stored object are within a preselected threshold, the embedded image may be replaced 340 with the image. The job may be processed 370 using a resource.

If the effective resolution of the embedded image and the effective resolution of an image corresponding to the stored object are not within a preselected threshold, the image may be replaced 345 with a reference to the embedded image. The embedded image may be downsampled 350, and the object of the embedded image may be stored 355. The job may be processed 370 using a resource.

If the object of the embedded image is not identical to a stored object, the embedded image may be downsampled 360, and the object of the embedded image may be stored 365. The job may be processed 370 using a resource.

EXAMPLE

Figure 4:
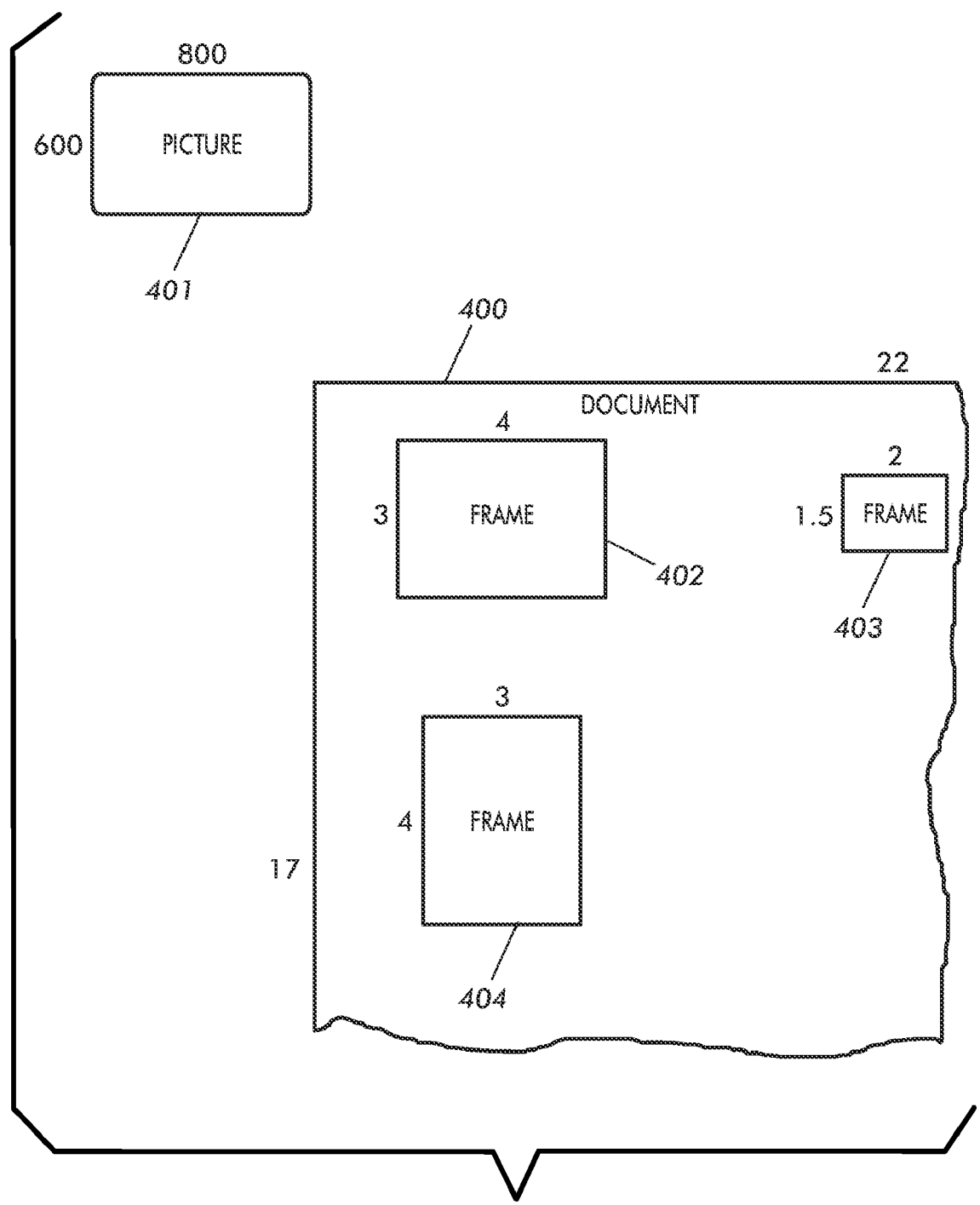
FIG. 4 depicts an exemplary document in which downsampling occurs according to an embodiment.

FIG. 4 depicts an exemplary document in which downsampling occurs according to an embodiment. As shown in FIG.

4, the document 400 includes three boxes with three different sizes for an image 401. The data representing an image 401 may be received from a computing device. The image 401 may be, for example, 600 by 800 pixels. The file in which the image is stored may have a page size of 17 by 22 inches. However, the workflow process may result in the image 401 being placed on an 8.5 by 11 inch page. Therefore, the scaling factor may be 50%. The preferred image resolution for image downsampling in the example is 500 dpi.

The first box 402 on the 8.5 by 11 inch page is 3 by 4 inches. Placing the data representing the image 401 in the first box 402 may result in an effective resolution of 400 dpi (200 dpi divided by a 50% scaling factor) for the placed image. Since the 400 dpi effective resolution is less than the preferred image resolution, the data representing the image in the first box may be processed without downsampling.

The data representing the same image 401 may then be placed in a second box 403 that is 1.5 by 2 inches. Placing the data representing the image 401 in the second box 403 may result in an effective resolution of 800 dpi (400 dpi divided by a 50% scaling factor) for the placed image. Because the first box 402 and the second box 403 contain data representing the same image 401 (and therefore the same object), the computing device may determine if the effective resolution of the data placed within the second box is within a predetermined threshold of the effective resolution of the data placed in the first box. The predetermined threshold may be, for example, 150 dpi. Because the effective resolution of the data in the second box 403 is 800 dpi and the effective resolution of the data in the first box 401 is 400 dpi, the effective resolution of the data representing the image in the second box is not within the predetermined threshold. Therefore, the data representing the image in the second box 403 may be downsampled by a second scaling factor.

The data representing the same image 401 may then be placed in a third box 404 that is 4 by 3 inches. Placing the image 401 in the third box 404 may result in an effective resolution of 300 dpi (150 dpi divided by a 50% scaling factor) for the placed image. Because the first box 402 and the third box 404 contain data representing the same image 401, the system may determine if the effective resolution of the data placed within the third box 404 is within a predetermined threshold of the effective resolution of the data placed in the first box. Because the effective resolution of the data in the third box 404 is 300 dpi and the effective resolution of the data in the first box 402 is 400 dpi, the effective resolution of the data placed in the third box is within the predetermined threshold of the effective resolution of the date placed in the first box. Therefore, the data representing the image in the third box may be processed without downsampling.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of preparing a document for printing, comprising:
   determining a preferred image resolution;
   receiving an electronic file comprising data representing a first embedded image having a nominal resolution and data representing a second embedded image;
   receiving a job comprising one or more operations to be performed on the electronic file;
   determining, by a computing device, an effective resolution for the first embedded image based on the nominal resolution and the one or more operations;
   determining an effective resolution for the second embedded image;
   determining whether the effective resolution for the first embedded image is greater than the preferred image resolution;
   if a first object of the first embedded image is identical to a second object of the second embedded image, wherein each of the first object and the second object is a representation of the corresponding embedded image:
      determining whether the effective resolution of the first embedded image and the effective resolution of the second embedded image are within a preselected threshold;
   downsampling the first embedded image based on a scaling factor; and
   processing the job, by a printing device, using the downsampled first embedded image.

2. The method of claim 1, further comprising:
   if the effective resolution of the second embedded image is not within the predetermined threshold of the effective resolution of the first embedded image:
      replacing the second embedded image with the first embedded image, and
      downsampling the first embedded image.

3. The method of claim 1, further comprising:
   if the effective resolution of the second embedded image is within the predetermined threshold of the effective resolution of the first embedded image, replacing the second embedded image with a reference to the first embedded image.

4. The method of claim 1 wherein the first embedded image comprises a portion of a document.

5. The method of claim 1 wherein the one or more operations comprise one or more of scaling and rotating.

6. The method of claim 1 wherein determining a preferred image resolution comprises receiving a preferred image resolution from a user.

7. The method of claim 1 wherein determining a preferred image resolution comprises receiving a raster image processing resolution.

8. The method of claim 1 wherein determining a preferred image resolution comprises receiving configuration data.

9. A system for preparing documents for printing, comprising:
   a computing device configured to:
      determine a preferred image resolution,
      receive a file comprising a first embedded image having a nominal resolution and a second embedded image,
      receive a job comprising one or more operations to be performed on the file,
      determine an effective resolution for the first embedded image,
      determine an effective resolution for the second embedded image,
      if a first object of the first embedded image is identical to a second object of the second embedded image, wherein each of the first object and the second object is a representation of the corresponding embedded image:
         determine whether the effective resolution of the first embedded image and the effective resolution of the second embedded image are within a preselected threshold, if the effective resolution of the second embedded image is not within the predetermined threshold of the effective resolution of the first embedded image, replace the second embedded image with the first embedded image, and if the effective resolution of the second embedded image is within the predetermined threshold of the effective resolution of the first embedded image, replace the second embedded image with a reference to the first embedded image, and downsample the first embedded image based on a scaling factor if the effective resolution for the first embedded image is greater than the preferred image resolution; and a resource configured to process a job using the downsampled first embedded image.

10. The system of claim 9 wherein the computing device is configured to determine an effective resolution for the first embedded image by evaluating one or more operations performed on the first embedded image.

11. A method of downsampling an image, comprising:
determining a preferred image resolution;
receiving an electronic file comprising data representing a first embedded image having a nominal resolution and data representing a second embedded image;
receiving a job comprising one or more operations to be performed on the electronic file;
determining, by a computing device, an effective resolution for the first embedded image based on the nominal resolution and the one or more operations;
determining an effective resolution for the second embedded image;
determining whether the effective resolution for the first embedded image is greater than the preferred image resolution;
if a first object of the first embedded image is identical to a second object of the second embedded image, wherein each of the first object and the second object is a representation of the corresponding embedded image:
determining whether the effective resolution of the first embedded image and the effective resolution of the second embedded image are within a preselected threshold;
downsampling the first embedded image based on a scaling factor; and
processing the job, by a resource, using the downsampled first embedded image.

12. The method of claim 11 wherein determining a preferred image resolution comprises receiving a raster image processing resolution.

13. The method of claim 11 wherein determining a preferred image resolution comprises receiving configuration data.

14. The method of claim 11 wherein determining a preferred image resolution comprises receiving a preferred image resolution from a user.

15. The method of claim 11 wherein the first embedded image comprises a portion of a document.

16. The method of claim 11 wherein the one or more operations comprise one or more of scaling and rotating.

17. The method of claim 11, further comprising:
if the effective resolution of the second embedded image is not within the preselected threshold of the effective resolution of the first embedded image, downsampling the second embedded image based on a second scaling factor.

18. The method of claim 11, further comprising:
if the effective resolution of the second embedded image is within the preselected threshold of the effective resolution of the first embedded image, replacing the second embedded image with a reference to the first embedded image.

* * * * *